United States Patent
Sendelbach (10) Patent No.: US 7,107,177 B2
(45) Date of Patent: Sep. 12, 2006

(54) COMBINING MULTIPLE REFERENCE MEASUREMENT COLLECTIONS INTO A WEIGHTED REFERENCE MEASUREMENT COLLECTION

(75) Inventor: Matthew J. Sendelbach, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/906,310

(22) Filed: Feb. 14, 2005

(65) Prior Publication Data

US 2006/0184334 A1    Aug. 17, 2006

(51) Int. Cl.
  *G01D 1/00* (2006.01)
  *G06F 15/00* (2006.01)
(52) U.S. Cl. ...................... 702/127; 702/189
(58) Field of Classification Search ............... 702/71, 702/127, 198
  See application file for complete search history.

(56) References Cited

U.S. PATENT DOCUMENTS

2003/0187840 A1* 10/2003 Laughery et al. .............. 707/4

OTHER PUBLICATIONS

Sendelbach, M. et al., "Scatterometry Measurement Precision and Accuracy Below 70 nm," Metrology, Inspection, and Process Control for Microlithography XVII, Proceedings of SPIE, vol. 5038, pp. 224-238, 2003.

* cited by examiner

*Primary Examiner*—John Barlow
*Assistant Examiner*—Jonathan Moffat
(74) *Attorney, Agent, or Firm*—Lisa U. Jaklitsch; Hoffman, Warnick & D'Alessandro LLC (57) ABSTRACT

Combining of reference measurement collections (RMCs) of at least three reference measurement systems into a weighted reference measurement collection (wRMC) is disclosed. Each RMC includes a plurality of corresponding sample measurements, each of which has a measurement value of the same sample. The invention plots corresponding measurement values to generate a plurality of data pairs for each possible RMC pairing. A best-fit line of the plurality of data pairs for each RMC pairing is then generated, and a residual for each data pair is calculated. A weight is then assigned to each sample measurement for each RMC based on the residuals associated with a respective RMC to which the sample measurement belongs, favoring a smaller residual more than a larger residual. A weighted reference measurement is then generated based on the weights, and the measurement value for the respective sample measurement for each RMC.

20 Claims, 8 Drawing Sheets

FIG. 1

| Sample Number | Sample ID | RMC A (old AFM) nm | RMC B (XSEM) nm | RMC C (Scat) nm | RMC x nm |
|---|---|---|---|---|---|
| 1. | 1234 | 400 | 380 | 450 | ⋮ |
| 2. | 5678 | 650 | 650 | 640 | ⋮ |
| 3. | 8907 | 700 | 710 | 650 | ⋮ |
| 4. | 345622 | 450 | 480 | 590 | ⋮ |
| 5. | 232345 | 650 | 689 | 666 | ⋮ |
| ⋮ | ⋮ | ⋮ | ⋮ | ⋮ | ⋮ |
| n | | | | | |

COMBINING MULTIPLE REFERENCE MEASUREMENT COLLECTIONS INTO A WEIGHTED REFERENCE MEASUREMENT COLLECTION

BACKGROUND OF THE INVENTION

1. Technical Field

The present invention relates generally to metrology tools, and more particularly, to combining reference measurement collections of at least three reference measurement systems into a weighted reference measurement collection.

2. Related Art

In the metrology industry, it is useful to know how well a given measurement system performs. One way to accomplish this task is to identify a reliable, trusted reference measurement system (hereinafter "RMS") and collect measurements of multiple samples (e.g., of wafers in the semiconductor industry) using the RMS to establish a respective reference measurement collection. A measurement system to be evaluated (i.e., a "system-under-test") can then be used to measure the same multiple samples. The measurement values for each system can then be compared, for example, by plotting the system-under-test measured values on one axis and the reference measurement collection values of the same samples on another axis of a graph. When these measurements encompass a range of values, a best-fit line can be drawn among them to determine how well the system-under-test matches the RMS.

The reference measurement collection can include measurements from either a single measurement system or multiple reference measurement systems (called a "composite RMC"). Composite RMCs are used in order to draw upon the advantages of each system, while avoiding or de-emphasizing the disadvantages of each system. For example, a critical dimension scanning electron microscope (CDSEM) system can be used as a reference for a critical dimension (CD) (linewidth). A CDSEM has the advantage that it is fast. However, it has an inherent offset in its measurement. However, if a limited number of samples are measured with the CDSEM and a cross-section scanning electron microscope (XSEM), the measurement using the XSEM can be used to determine this offset. The XSEM is slow but has little offset. In this example, the CDSEM and XSEM together form a composite RMC.

Typically, multiple RMSs are used in a cascading effect, where each system is referenced to the next system. One inherent problem with conventional RMS approaches (either single or multiple systems), however, is that they sometimes do not provide a good reference because every measurement, no matter how good, has some kind of error. Reliance on such techniques is especially dangerous when the user does not realize the RMS that is considered reliable (or good enough) is, in fact, not reliable. Another shortcoming of conventional multiple RMS approaches is that sometimes a user cannot determine which system should be the RMS, which is a common situation when dealing with leading-edge metrology systems.

One approach for generating composite RMCs is to simply average measurements for each sample from the various RMSs. Unfortunately, this approach does not penalize measurements that do not agree well with measurements from other systems of the same sample, which are referred to as "flyers." Another approach to composite RMSs is described in: M. Sendelbach and C. Archie, "Scatterometry measurement precision and accuracy below 70 nm," Metrology, Inspection, and Process Control for Microlithography XVII, Proceedings of SPIE, Vol. 5038, pp. 224–238, 2003. This approach also does not address the flyer issue.

In view of the foregoing, there is a need in the art for improved techniques for generating a composite reference measurement collection.

SUMMARY OF THE INVENTION

The invention combines reference measurement collections (RMCs) of at least three reference measurement systems into a weighted reference measurement collection (wRMC). Each RMC includes a plurality of corresponding sample measurements, each of which has a measurement value of the same sample. The invention plots corresponding measurement values to generate a plurality of data pairs for each possible RMC pairing. A best-fit line of the plurality of data pairs for each RMC pairing is then generated, and a residual for each data pair is calculated. A weight is then assigned to each sample measurement for each RMC based on the residuals associated with a respective RMC to which the sample measurement belongs, favoring a smaller residual more than a larger residual. A weighted reference measurement is then generated based on the weights, and the measurement value for the respective sample measurement for each RMC.

The wRMC that results has been generated by treating the measurement results of each sample independently of the measurement results of the other samples. The reference measurements are not simply averaged, but instead combined in such a way that systems that agree more with other systems are rewarded by having a greater influence on the combined result, while systems that agree less with other systems are punished by having less influence on the combined result. The invention also prevents a user from having to choose which tool is the best RMS.

A first aspect of the invention is directed to a method of combining reference measurement collections of at least three reference measurement systems into a weighted reference measurement collection, each reference measurement collection (RMC) including a plurality of corresponding sample measurements, each corresponding sample measurement having a measurement value of the same sample, the method comprising the steps of: for each possible RMC pairing, plotting corresponding measurement values to generate a plurality of data pairs for each RMC pairing; generating a best-fit line of the plurality of data pairs for each RMC pairing; calculating a residual for each data pair, each residual associated with each RMC of the RMC pairing to which the respective residual belongs; assigning a weight to each sample measurement for each RMC, wherein each weight is based on the residuals associated with a respective RMC to which the sample measurement belongs and favors a smaller residual more than a larger residual; and for each respective sample measurement, generating a weighted reference measurement based on the measurement value for the respective sample measurement for each RMC and the weights of the respective sample measurement for each RMC.

A second aspect of the invention includes a system for combining reference measurement collections of at least three reference measurement systems into a weighted reference measurement collection, each reference measurement collection (RMC) including a plurality of corresponding sample measurements, each corresponding sample measurement having a measurement value of the same sample, the system comprising: means for, for each possible RMC pairing, plotting corresponding measurement values to generate a plurality of data pairs for each RMC pairing; means for generating a best-fit line of the plurality of data pairs for each RMC pairing; means for calculating a residual for each data pair, each residual associated with each RMC of the RMC pairing to which the respective residual belongs; means for assigning a weight to each sample measurement for each RMC, wherein each weight is based on the residuals associated with a respective RMC to which the sample measurement belongs and favors a smaller residual more than a larger residual; and means for, for each respective sample measurement, generating a weighted reference measurement based on the measurement value for the respective sample measurement for each RMC and the weights of the respective sample measurement for each RMC.

A third aspect of the invention related to a program product stored on a computer readable medium for combining reference measurement collections of at least three reference measurement systems into a weighted reference measurement collection, each reference measurement collection (RMC) including a plurality of corresponding sample measurements, each corresponding sample measurement having a measurement value of the same sample, the computer readable medium comprising program code for performing the following steps: for each possible RMC pairing, plotting corresponding measurement values to generate a plurality of data pairs for each RMC pairing; generating a best-fit line of the plurality of data pairs for each RMC pairing; calculating a residual for each data pair, each residual associated with each RMC of the RMC pairing to which the respective residual belongs; assigning a weight to each sample measurement for each RMC, wherein each weight is based on the residuals associated with a respective RMC to which the sample measurement belongs and favors a smaller residual more than a larger residual; and for each respective sample measurement, generating a weighted reference measurement based on the measurement value for the respective sample measurement for each RMC and the weights of the respective sample measurement for each RMC.

A fourth aspect of the invention is directed to a method of combining reference measurement collections of at least three reference measurement systems into a weighted reference measurement collection, each reference measurement collection (RMC) including a plurality of corresponding sample measurements, each corresponding sample measurement having a measurement value of the same sample, the method comprising the steps of: assigning a weight to each sample measurement of each reference measurement collection indicative of an ability of the respective reference measurement system to measure that sample compared to other reference measurement systems; and generating a weighted reference measurement collection (wRMC) by calculating, for each respective sample measurement, a weighted reference measurement based on the measurement value for the respective sample measurement for each RMC and the weights of the respective sample measurement for each RMC.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION

For purposes of clarity only, the description includes the following headings: I. Introduction, II. System Overview, III. Operational Methodology, and IV. Conclusion.

I. Introduction

As stated above, the invention combines reference measurement collections of at least three reference measurement systems (hereinafter "RMS") into a weighted reference measurement collection (abbreviated "wRMC"). The wRMC that results is generated by treating the measurement results from each sample independently of the measurement results from the other samples. The reference measurement values of the wRMC are not simply averages of the RMCs, but instead combinations in which systems that agree more with other systems are rewarded by having a greater influence on the combined result, while systems that agree less with other systems are punished by having less influence on the combined result.

The invention can be implemented any time three or more independent measurement systems are used for a composite RMS. The invention can be used to determine how well each RMS compares to the wRMC (i.e., which system agrees the most with the others), or it can be used to determine how well another system (that was not used as part of the wRMS) compares to the wRMC. If later experiments are planned, and the user can only choose one system to be the RMS, this invention provides a way to determine which system is the best RMS.

Figure 1:
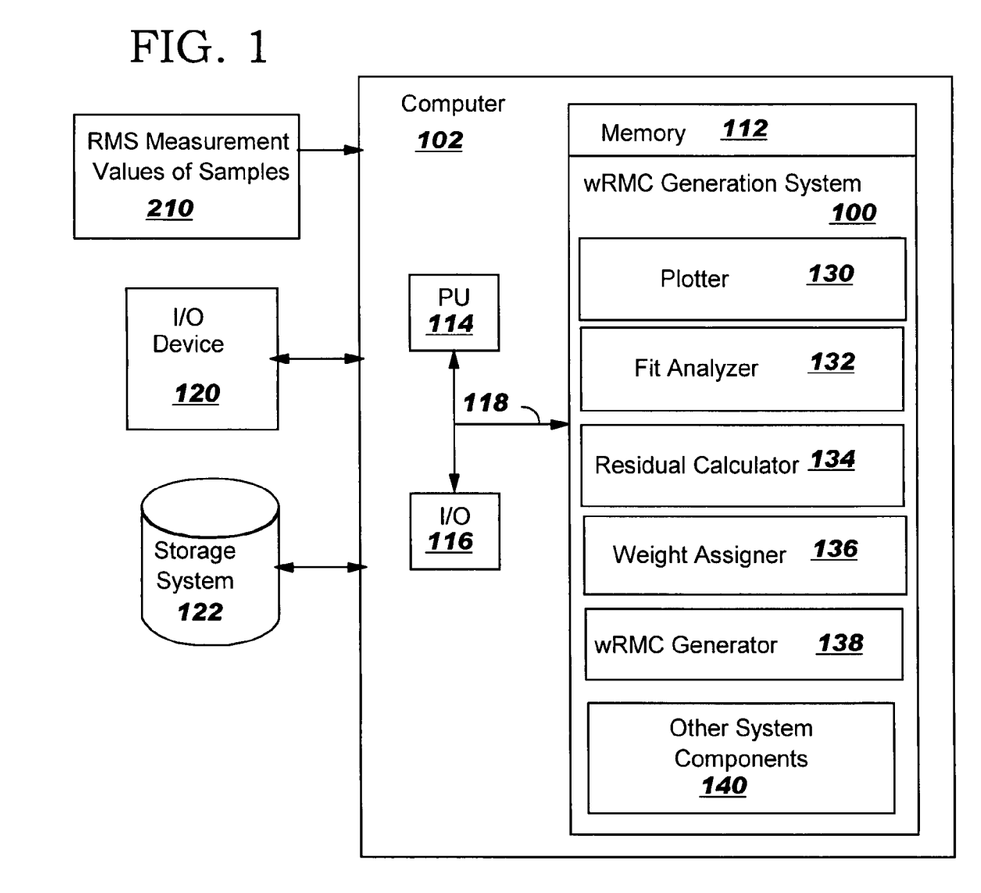
FIG. 1 shows block diagram of one embodiment of a weighted reference measurement generating system according to the invention.

II. System Overview:

With reference to the accompanying drawings, FIG. 1 is a block diagram of a weighted reference measurement collection generation system 100 in accordance with the invention. System 100 is shown implemented on computer 102 as computer program code. To this extent, computer 102 is shown including a memory 112, a processing unit 114, an input/output (I/O) interface 116, and a bus 118. Further, computer 102 is shown in communication with an external I/O device/resource 120 and a storage system 122. In general, processing unit 114 executes computer program code, such as system 100, that is stored in memory 112 and/or storage system 122. While executing computer program code, processing unit 114 can read and/or write data to/from memory 112, storage system 122, and/or I/O device 120. Bus 118 provides a communication link between each of the components in computer 102, and I/O device 120 can comprise any device that enables user to interact with computer 102 (e.g., keyboard, pointing device, display, etc.).

Alternatively, a user can interact with another computing device (not shown) in communication with computer 102. In this case, I/O interface 116 can comprise any device that enables computer 102 to communicate with one or more other computing devices over a network (e.g., a network system, network adapter, I/O port, modem, etc.). The network can comprise any combination of various types of communications links. For example, the network can comprise addressable connections that may utilize any combination of wireline and/or wireless transmission methods. In this instance, the computing devices (e.g., computer 102) may utilize conventional network connectivity, such as Token Ring, Ethernet, WiFi or other conventional communications standards. Further, the network can comprise one or more of any type of network, including the Internet, a wide area network (WAN), a local area network (LAN), a virtual private network (VPN), etc. Where communications occur via the Internet, connectivity could be provided by conventional TCP/IP sockets-based protocol, and a computing device could utilize an Internet service provider to establish connectivity to the Internet.

Computer 102 is only representative of various possible combinations of hardware and software. For example, processing unit 114 may comprise a single processing unit, or be distributed across one or more processing units in one or more locations, e.g., on a client and server. Similarly, memory 112 and/or storage system 122 may reside at one or more physical locations. Memory 112 and/or storage system 122 can comprise any combination of various types of computer-readable media and/or transmission media including magnetic media, optical media, random access memory (RAM), read only memory (ROM), a data object, etc. I/O interface 116 can comprise any system for exchanging information with one or more I/O devices. Further, it is understood that one or more additional components (e.g., system software, math co-processing unit, etc.) not shown in FIG. 1 can be included in computer 102. To this extent, computer 102 can comprise any type of computing device such as a network server, a desktop computer, a laptop, a handheld device, a mobile phone, a pager, a personal data assistant, etc. However, if computer 102 comprises a handheld device or the like, it is understood that one or more I/O devices (e.g., a display) and/or storage system 122 could be contained within computer 102, not externally as shown.

As discussed further below, system 100 is shown including a plotter 130, a fit analyzer 132, a residual calculator 134, a weight assigner 136, wRMC generator 138 and other system components 140.

III. Operational Methodology

Figure 2:
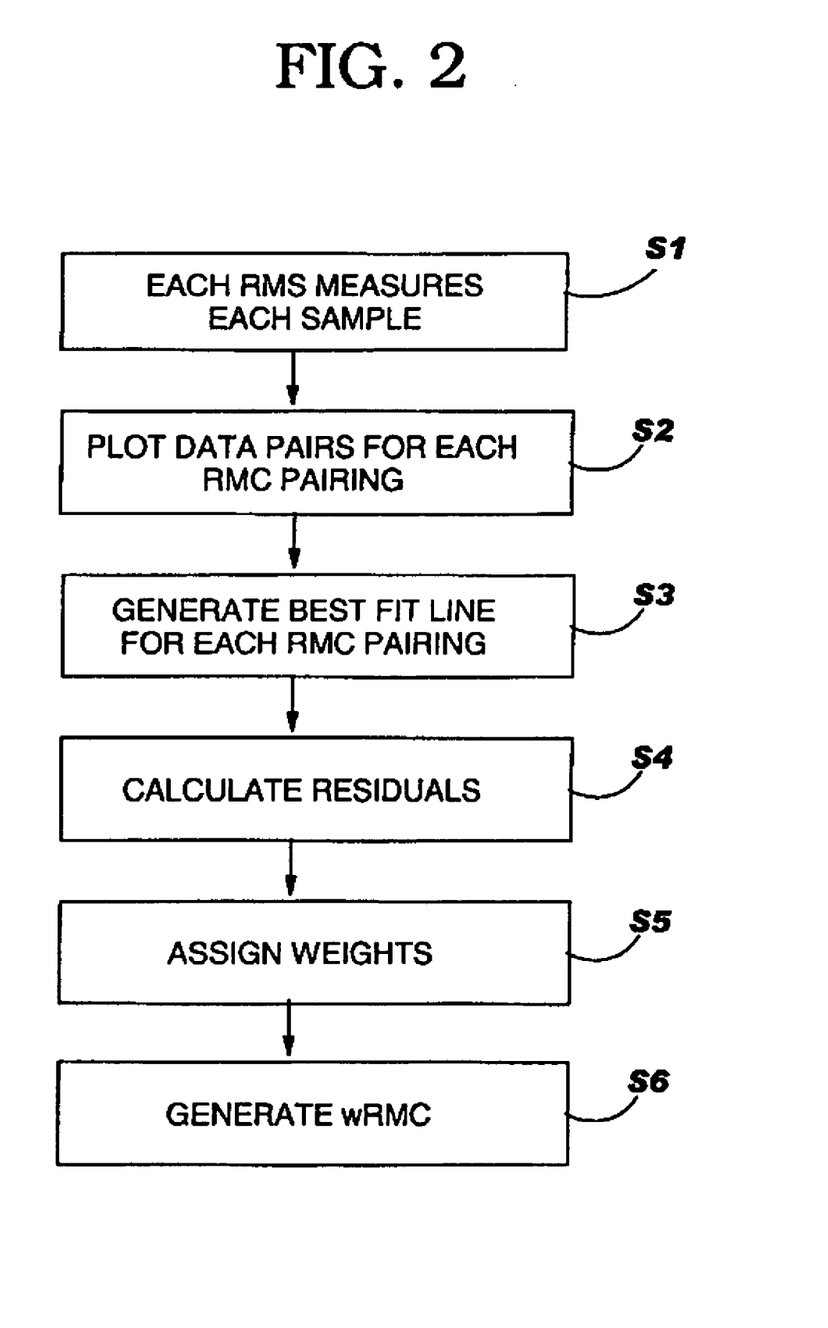
FIG. 2 shows a flow diagram of one embodiment of an operational methodology of the system of FIG. 1.

Turning to FIG. 2, one embodiment of operational methodology for the system of FIG. 1 will now be described. The following description will be made as though the measurement values of three RMSs A, B and C are being combined into a weighted reference measurement collection (hereinafter "wRMC"). It should be recognized, however, that the teachings of the invention are applicable to any number of RMSs greater than three. Where two RMSs are used, averaging of values is preferred.

Figure 3:
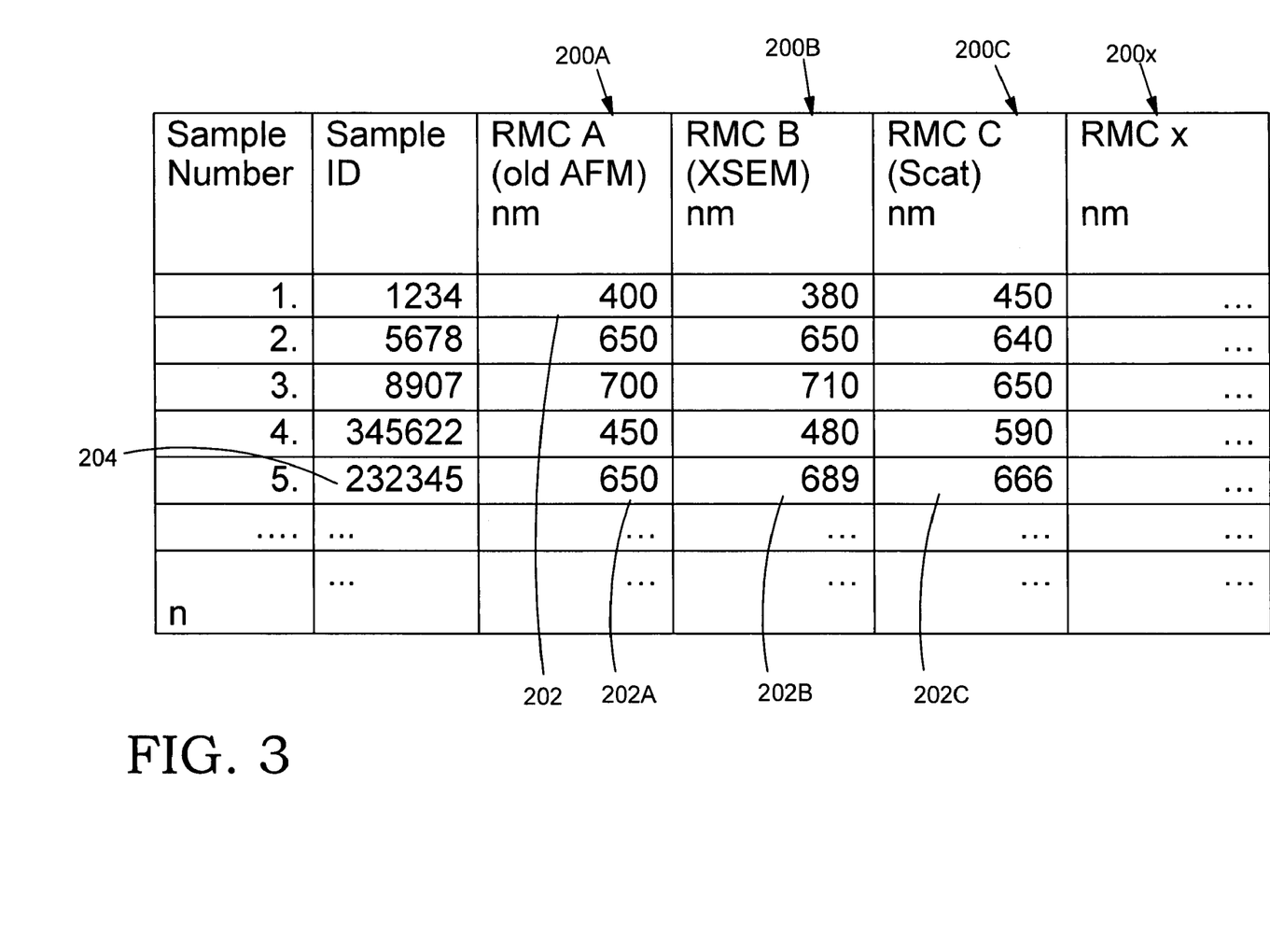
FIG. 3 shows a table of reference measurement collections.

With reference to FIG. 3, a table of an illustrative environment for use in explaining the invention including data for RMS A, B and C is shown. Each RMS A, B and C includes its own reference measurement collection (RMC) 200A, 200B, 200C, 200 x, where x is the last RMC. Each RMC includes a plurality of corresponding "sample measurements" e.g., 202A, 202B, 202C, each of which includes a measurement value of the same sample 204. That is, each RMC includes a sample measurement (cells) for each sample to be measured. "n" is an integer number representing the number of samples. Each sample may include a sample identification for clarity. In one embodiment, the actual samples are user-selected artifacts that challenge the measurement systems in question, i.e., RMSs and a measurement system under test (hereinafter "MSUT") that is to be evaluated. For example, the plurality of samples may include line widths ranging from 400 nm to 900 nm. However, ranges in size are not necessary.

Returning to FIG. 2, in a first preliminary step S1, each RMS measures a plurality of n samples. As shown in FIG. 1, the RMS measurement values of the samples 210 are input into system 102 in any now known or later developed fashion. The RMS measurements result in n measurement values for each RMS, which populate a respective RMC.

Figure 4:
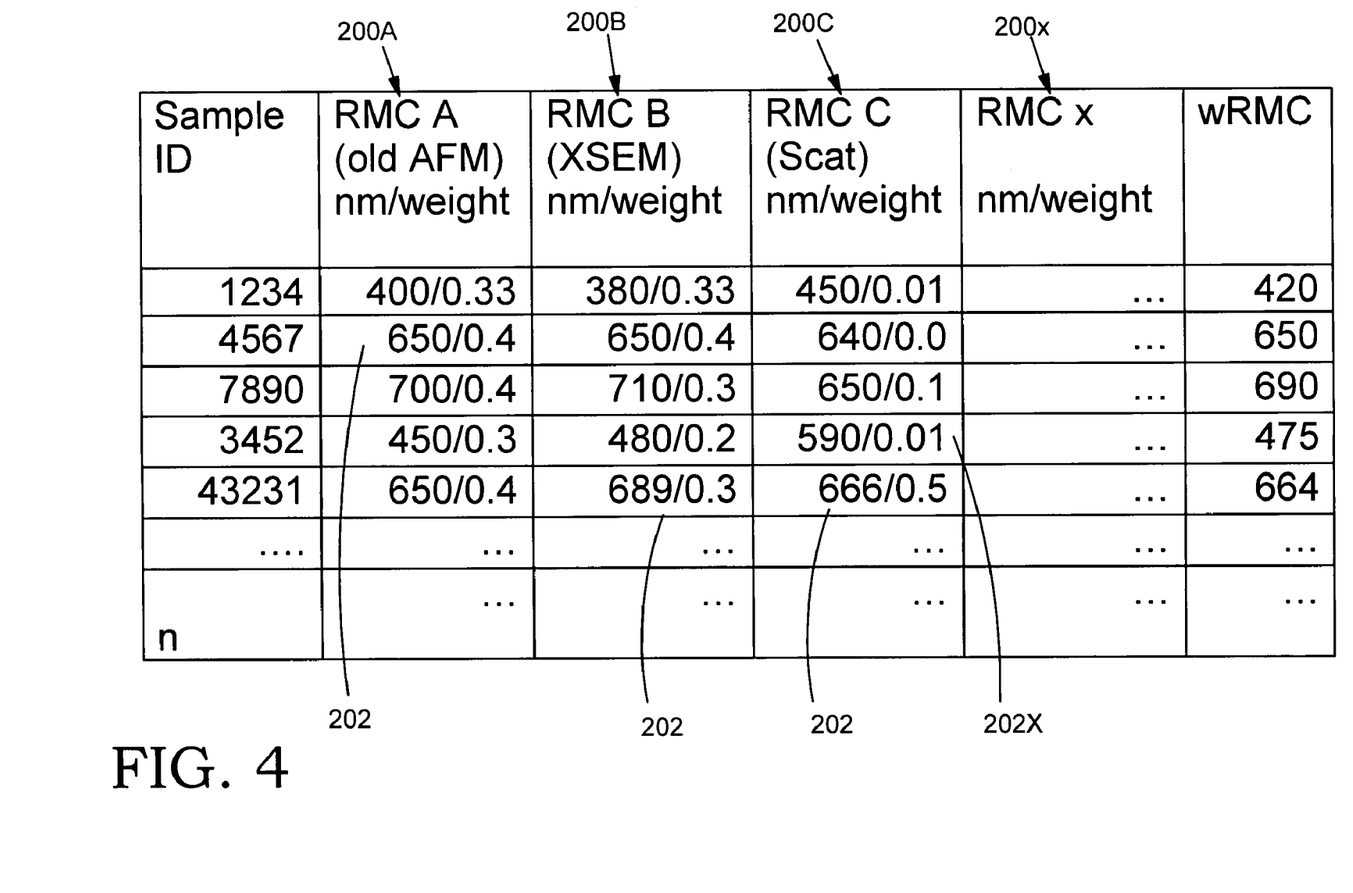
FIG. 4 shows the table of FIG. 3 including weights and a weighted reference measurement collection generated according to the invention.
Figure 5:
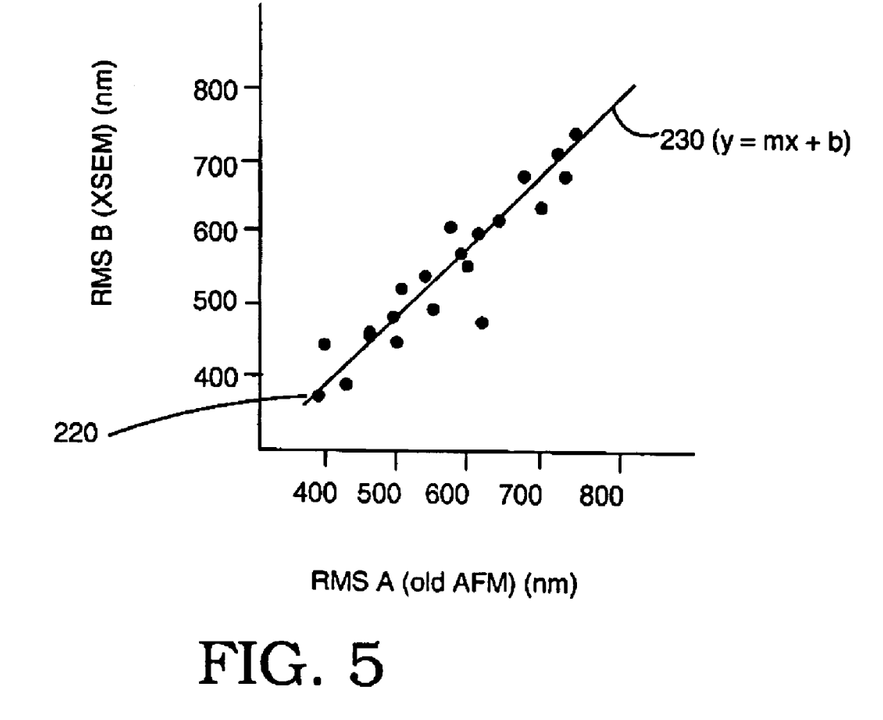
FIGS. 5–7 show graphs of one step of one embodiment of a method of the invention.
Figure 6:
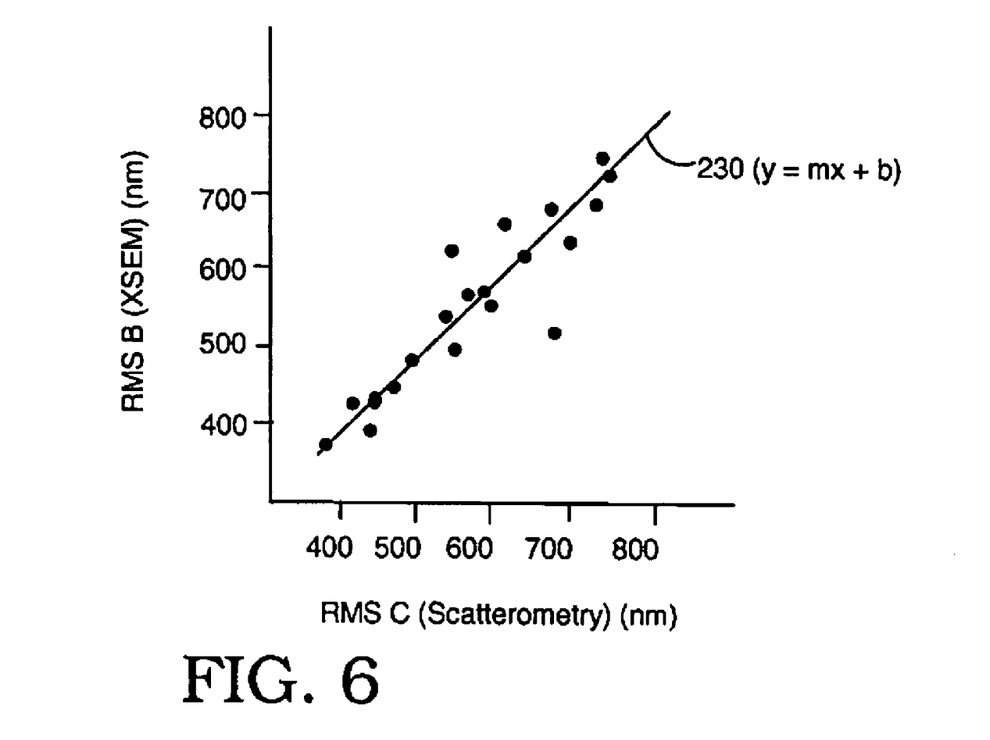
Figure 7:
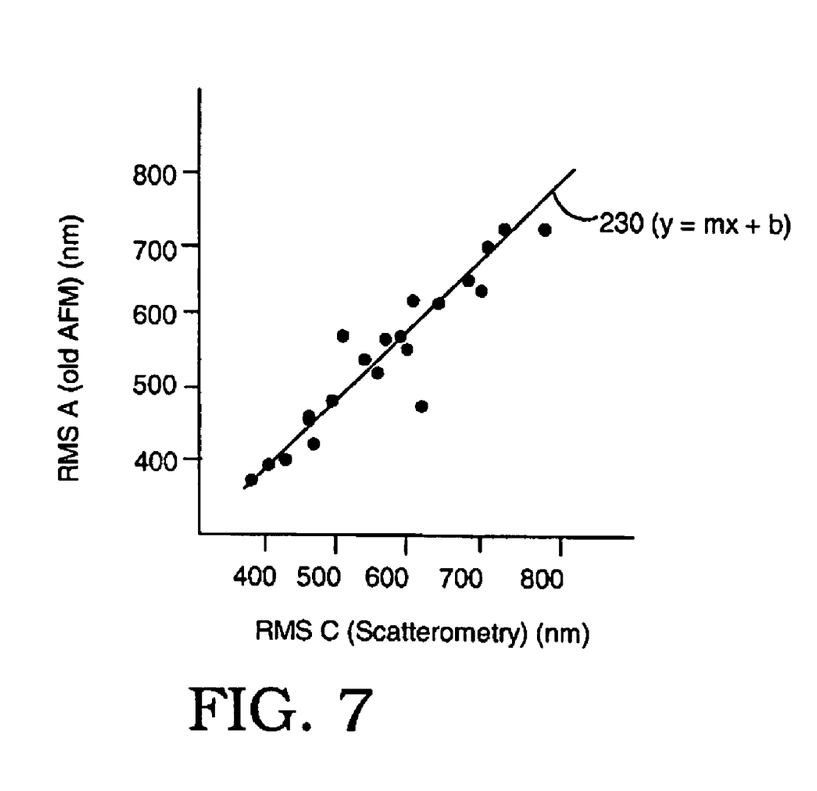

Steps S2–S5 represent a step of assigning a weight to each sample measurement of each RMC indicative of an ability of the respective RMS to measure that sample compared to other reference measurement systems. In a second step S2, for each possible RMC (or RMS) pairing, corresponding measurement values are plotted to generate a plurality of data pairs for each RMC pairing by plotter 130 (FIG. 1). FIGS. 5–7 show graphs in which corresponding measurement values of each sample are plotted with the x-axis showing the values from one RMC and the y-axis showing the values from a second RMC. (Note, graphs do not match data for FIGS. 3–4). The measurement values for each RMC form a data pair, i.e., a data point for the graph. For example, FIG. 5 shows measurement values for RMC A, which is for an "old" atomic force microscope (AFM) RMS, on the x-axis versus RMC B on the y-axis, which is for a cross-section scanning electron microscope (XSEM) RMS. For one particular sample in FIG. 5, data pair 220 for a sample, e.g., sample ID 1234, is formed based on the measurement value of approximately 389 nm by RMS A and approximately 475 nm by RMS B. Because only two RMCs can be compared like this in one plot, a plot is generated for each possible pair-wise combination of RMCs. That is, in the case of three RMSs, RMCs are plotted as follows: A vs. B, B vs. C, A vs. C, as shown in FIGS. 5–7. If there were four RMCs, there would instead be 6 plots (A vs. B, A vs. C, A vs. D, B vs. C, B vs. D, C vs. D). If there were five RMCs, there would be 10 plots, and so on for larger numbers of RMCs.

In a third step S3, a best-fit line of the plurality of data pairs for each RMC pairing is generated by fit analyzer 132 (FIG. 1). FIGS. 5–7 show best-fit lines 230 for each RMC pairing. There are a number of different fit analysis techniques known to those skilled in the art for generating a best-fit line. Two illustrative fit analyses that could be used are: a total measurement uncertainty (TMU) analysis or an ordinary-least squares (OLS) analysis. A TMU fit analysis can be conducted according to: M. Sendelbach and C. Archie, "Scatterometry measurement precision and accuracy below 70 nm," Metrology, Inspection, and Process Control for Microlithography XVII, Proceedings of SPIE, Vol. 5038, pp. 224–238, 2003. FIGS. 5–7 illustrate use of the TMU fit analysis. In any case, the best-fit line generation results in a line having a known slope m and y-intercept b.

Figure 8:
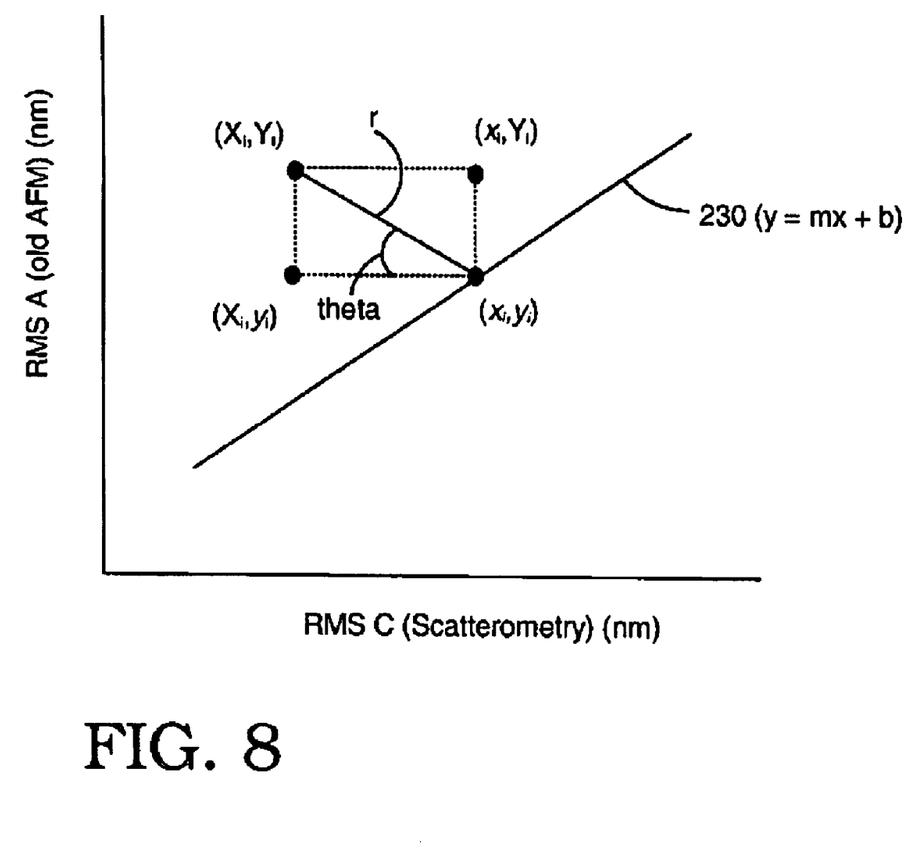
FIG. 8 shows a graph illustrating residuals used in one embodiment of the method of the invention.

In step S4, a residual r for all data pairs is calculated by residual calculator 134 (FIG. 1). Referring to FIG. 8, a "residual" is the distance from a data pair $(X_i, Y_i)$ to the best-fit line 230 along a direction determined by a residual angle $\ominus$ (theta). The length of residual r can be calculated based on the measurement values for a respective data pair (i.e., $X_i$ and $Y_i$) (FIG. 8), slope m and y-intercept b of best-fit line 230 and residual angle $\ominus$ using basic algebra and trigonometry. Note that residual angle $\ominus$ is determined by the fit analysis chosen in the previous step (e.g., TMU, OLS, etc.). That is, each method has its own way to determine residual angle $\ominus$. For TMU, the calculation of residual angle $\ominus$ is shown in the publication by M. Sendelbach and C. Archie, "Scatterometry measurement precision and accuracy below 70 nm," Metrology, Inspection, and Process Control for Microlithography XVII, Proceedings of SPIE, Vol. 5038, pp. 224–238, 2003. Residual angle $\ominus$ is defined by equation 20 on page 229. In the OLS analysis, residual angle is 90 degrees. Each residual r is associated with each RMC of the RMC pairing to which the respective residual belongs. Hence, residuals r for each data pair from: FIG. 5 have the denotation $r_{zAB}$, FIG. 6 have the denotation $r_{zBC}$, and FIG. 7 have the denotation $r_{zAC}$, where z is the particular sample measurement in question (perhaps indicated by a respective sample ID).

In step S5, a weight is assigned (set) to each sample measurement 202 (FIG. 3) for each RMC by weight assigner 136 (FIG. 1). FIG. 4 shows a table, similar to that of FIG. 3, but including weights for each sample measurement 202. Each weight is based on the residuals associated with a respective RMC to which the sample measurement belongs. For example, for sample measurement 202X in FIG. 4, each residual associated with RMC C would be used to determine the weight for that sample measurement, i.e., residuals $r_{AC}$ and $r_{BC}$. There are multiple mathematical techniques to calculate a weight. One rule that must be met in each case, however, is that smaller residuals are favored with better weights than larger residuals. This rule ensures that RMSs that agree well with other systems, as indicated by their smaller residuals, are properly "rewarded" with better weighting, and those with larger residuals are "punished" with worse weighting. A "better weighting" is a weighting that shows a preference compared to other weightings. For example, if a higher weighting indicates a smaller residual, a better weighting would be a relatively higher value. Similarly, if a lower weighting indicates a smaller residual, a better weighting would be a relatively lower value. As indicated in FIG. 4, higher weighting indicates a better weighting.

In one embodiment, the weight is assigned for a three RMC situation according to:

$$W_{zA}=k_1(1/r_{zAB})^t+k_2(1/r_{zAC})^u,$$

$$W_{zB}=k_1(1/r_{zAB})^t+k_2(1/r_{zBC})^u,$$

$$W_{zC}=k_1(1/r_{zAC})^t+k_2(1/r_{zBC})^u,$$

where $W_{zA}$, $W_{zB}$, $W_{zC}$ are the weights for sample measurement z for RMSs A, B and C, respectively, and $r_{zAB}$, $r_{zAC}$, and $r_{zBC}$ are the residuals for each data pair (e.g., AB, AC and BC) associated with the RMC to which the sample measurement z belongs. The values t, $k_1$, $k_2$ and u are constants arbitrarily chosen by the user as desired, and t>0, u>0, $k_1$>0 and $k_2$>0. Each part that is summed is referred to herein as an "inverse coefficient," which includes an inverse of a residual multiplied by a constant $k_1$ or $k_2$ and raised to a power of t or u. In one preferred embodiment, however, t, $k_1$, $k_2$ and u are each one (1). In other words, the weight is assigned by determining an inverse coefficient of the residual for each data pair associated with the RMC to which the sample measurement belongs, and then calculating the weight by summing the inverse coefficients.

In an alternative embodiment, weights can be calculated, for example, as:

$$W_{zA}=K_1(1/(r_{zAB}+r_{zAC}))^v,$$

$$W_{zB}=K_1(1/(r_{zAB}+r_{zBC}))^v,$$

$$W_{zC}=K_1(1/(r_{zAC}+r_{zBc}))^v$$

where $K_1$ and v are constants arbitrarily chosen by the user as desired, and where v>0 and $K_1$>0. It should be recognized that the weights for other RMCs can be calculated with similar equations using the associated residuals. In other words, the weight is assigned by determining a "residual sum inverse coefficient" for each data pair associated with the RMC to which the sample measurement belongs. Each "residual sum inverse coefficient" includes an inverse of a sum of the associated residuals multiplied by a constant $K_1$ and raised to a power of v. In one embodiment, $K_1$ and v are each one (1).

In step S6, a weighted reference measurement collection (wRMC) is generated by wRMC generator 138. As shown in FIG. 4, in one embodiment, wRMC generator 138 calculates, for each respective sample measurement, a weighted reference measurement (indicated in cells of wRMC) based on the measurement value for the respective sample measurement for each RMC and the weights of the respective sample measurement for each RMC. In one embodiment, each weighted reference measurement is calculated as:

$$M_{zwRMC}=((W_{zA})(M_{zA})+(W_{zB})(M_{zB})+(W_{zC})(M_{zC}))/(W_{zA}+W_{zB}+W_{zC}),$$

where $M_{zwRMC}$ is the weighted reference measurement for a respective sample measurement z; $W_{zA}$, $W_{zB}$, $W_{zC}$ are the weights for respective sample measurement z for RMC A, B and C, respectively; and $M_{zA}$, $M_{zB}$, $M_{zC}$ are the measurement values for respective sample measurement z for RMC A, B and C, respectively. In other words, a weighted reference measurement is calculated for a respective sample measurement by dividing a first sum of multiples of each measurement value and a respective weight of the respective sample measurement by a second sum of all weights for the respective sample measurement. The equation above can, of course, be extended for situations where there are more than three RMSs.

In an alternative embodiment, $M_{zwRMC}$ can also be calculated as:

$$M_{zwRMC}=((1/W_{zA})(M_{zA})+(1/W_{zB})(M_{zB})+(1/W_{zC})(M_{zC}))/((1/W_{zA})+(1/W_{zB})+(1/W_{zC})).$$

Here, a larger weight corresponds to that RMC being represented less in the wRMC. In this case, a larger residual should result in a larger weight. In this case, a weighted reference measurement is calculated for a respective sample measurement by dividing a first sum of inverses of multiples of each measurement value and a respective weight of the respective sample measurement by a second sum of inverses of all weights for the respective sample measurement. This weighted reference measurement calculation can also be completed using the above-described alternative embodiment for calculating weights. It should be understood that other alternative equations for weights and weighted reference measurements can also be used.

A weighted reference measurement can be thought of as how the weighted reference measurement system would have measured samples, if the weighted RMS were a physical system. In reality, each weighted reference measurement of the wRMC is a value that is a combination of the values of several physical RMCs, with greater weight being given to those measurements that agree with other measurements. In this way, "flyers" (measurements that do not agree well with measurements from other systems of the same sample) do not carry much weight. The wRMC does not require the user to decide which measurements are flyers and which are not. Rather, the invention automatically lessens the influence of measurement values that are more different from the other measurement values in determining the weighted reference measurement for the wRMC. In addition, the invention treats each RMS fairly in that the user does not have to treat any RMS differently than any other RMS, which is advantageous when it is uncertain which RMS is the best RMS.

Once a user has the n weighted reference measurements of the wRMC defined, the user can compare these values to the original measurement values made by each RMS to determine which RMS is most reliable. Alternatively, the user can compare the wRMC values to the original measurement values made by one RMS to determine whether that RMS is reliable. In addition, the user can compare the weighted reference measurements to the measurement values made by another system under test to determine how well that system under test measures.

IV. CONCLUSION

It is understood that the order of the above-described steps is only illustrative. To this extent, one or more steps can be performed in parallel, in a different order, at a remote time, etc. Further, one or more of the steps may not be performed in various embodiments of the invention.

It is understood that the present invention can be realized in hardware, software, a propagated signal, or any combination thereof, and may be compartmentalized other than as shown. Any kind of computer/server system(s)—or other apparatus adapted for carrying out the methods described herein—is suitable. A typical combination of hardware and software could be a general purpose computer system with a computer program that, when loaded and executed, carries out the respective methods described herein. Alternatively, a specific use computer, containing specialized hardware for carrying out one or more of the functional tasks of the invention (e.g., system 100), could be utilized. The present invention also can be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a collection of instructions intended to cause a system having an information processing capability to perform a particular function either directly or after either or both of the following: (a) conversion to another language, code or notation; and/or (b) reproduction in a different material form. Furthermore, it should be appreciated that the teachings of the present invention could be offered as a business method on a subscription or fee basis. For example, the system and/or computer could be created, maintained, supported and/or deployed by a service provider that offers the functions described herein for customers. That is, a service provider could offer the functionality described above.

While this invention has been described in conjunction with the specific embodiments outlined above, it is evident that many alternatives, modifications and variations will be apparent to those skilled in the art. Accordingly, the embodiments of the invention as collection forth above are intended to be illustrative, not limiting. Various changes may be made without departing from the spirit and scope of the invention as defined in the following claims.

What is claimed is:

1. A method for determining a reliability of a target measurement by combining reference measurement collections of at least three reference measurement systems into a weighted reference measurement collection, each reference measurement collection (RMC) including a plurality of corresponding sample measurements, each corresponding sample measurement having a measurement value of the same sample, the method comprising the steps of:

for each possible RMC pairing, plotting corresponding measurement values to generate a plurality of data pairs;

generating a best-fit line of the plurality of data pairs for each RMC pairing;

calculating a residual for each data pair, each residual associated with each RMC of the RMC pairing to which the respective residual belongs;

assigning a weight to each sample measurement for each RMC, wherein each weight is based on the residuals associated with a respective RMC to which the sample measurement belongs and favors a smaller residual more than a larger residual;

for each respective sample measurement, generating a weighted reference measurement based on the measurement value for the respective sample measurement for each RMC and the weights of the respective sample measurement for each RMC; and comparing the weighted reference measurement with the target measurement to determine the reliability of the target measurement.

2. The method of claim 1, wherein the best-fit line generating step includes using a fit analysis chosen from one of: a total measurement uncertainty (TMU) analysis and an ordinary-least squares (OLS) analysis.

3. The method of claim 2, wherein the residual calculating step includes determining the residual for each data pair based on the measurement values of each data pair, a slope and y-intercept of the best-fit line and a residual angle, wherein the residual angle depends on the fit analysis.

4. The method of claim 1, wherein the weight assigning step includes for a respective sample measurement:

calculating an inverse coefficient of the residual for each data pair associated with the RMC to which the sample measurement belongs; and calculating the weight by summing the inverse coefficients.

5. The method of claim 1, wherein the weight assigning step includes for a respective sample measurement calculating a residual sum inverse coefficient for each data pair associated with the RMC to which the sample measurement belongs.

6. The method of claim 1, wherein the weighted reference measurement generating step includes for a respective sample measurement:

calculating the weighted reference measurement by dividing a first sum of multiples of each measurement value and a respective weight of the respective sample measurement by a second sum of all weights for the respective sample measurement.

7. The method of claim 1, wherein the weighted reference measurement generating step includes for a respective sample measurement:

calculating the weighted reference measurement by dividing a first sum of inverses of multiples of each measurement value and a respective weight of the respective sample measurement by a second sum of inverses of all weights for the respective sample measurement.

8. A system for determining a reliability of a target measurement by combining reference measurement collections of at least three reference measurement systems into a weighted reference measurement collection, each reference measurement collection (RMC) including a plurality of corresponding sample measurements, each corresponding sample measurement having a measurement value of the same sample, the system comprising:
   means for, for each possible RMC pairing, plotting corresponding measurement values to generate a plurality of data pairs;
   means for generating a best-fit line of the plurality of data pairs for each RMC pairing;
   means for calculating a residual for each data pair, each residual associated with each RMC of the RMC pairing to which the respective residual belongs;
   means for assigning a weight to each sample measurement for each RMC, wherein each weight is based on the residuals associated with a respective RMC to which the sample measurement belongs and favors a smaller residual more than a larger residual; and
   means for, for each respective sample measurement, generating a weighted reference measurement based on the measurement value for the respective sample measurement for each RMC and the weights of the respective sample measurement for each RMC, the weighted reference measurement being compared with the target measurement to determine the reliability of the target measurement.

9. The system of claim 8, wherein the best-fit line generating means includes means for using a fit analysis chosen from one of: a total measurement uncertainty (TMU) analysis and an ordinary-least squares (OLS) analysis.

10. The system of claim 8, wherein the residual calculating means includes means for determining the residual for each data pair based on the measurement values of each data pair, a slope and y-intercept of the best-fit line and a residual angle, wherein the residual angle depends on the fit analysis.

11. The system of claim 8, wherein the weight assigning means includes means for, for a respective sample measurement:
   calculating an inverse of the residual for each data pair associated with the RMC to which the sample measurement belongs; and
   calculating the weight by summing the inverses.

12. The system of claim 8, wherein the weighted reference measurement generating means includes means for, for a respective sample measurement:
   calculating the weighted reference measurement by dividing a first sum of multiples of each measurement value and a respective weight of the respective sample measurement by a second sum of all weights for the respective sample measurement.

13. A program product stored on a computer readable medium, which when executed, enables a computer infrastructure to determine a reliability of a target measurement by combining reference measurement collections of at least three reference measurement systems into a weighted reference measurement collection, each reference measurement collection (RMC) including a plurality of corresponding sample measurements, each corresponding sample measurement having a measurement value of the same sample, the program product comprising computer program code for enabling the computer infrastructure to perform the following steps:
   for each possible RMC pairing, plotting corresponding measurement values to generate a plurality of data pairs;
   generating a best-fit line of the plurality of data pairs for each RMC pairing;
   calculating a residual for each data pair, each residual associated with each RMC of the RMC pairing to which the respective residual belongs;
   assigning a weight to each sample measurement for each RMC, wherein each weight is based on the residuals associated with a respective RMC to which the sample measurement belongs and favors a smaller residual more than a larger residual; and
   for each respective sample measurement, generating a weighted reference measurement based on the measurement value for the respective sample measurement for each RMC and the weights of the respective sample measurement for each RMC, the weighted reference measurement being compared with the target measurement to determine the reliability of the target measurement.

14. The program product of claim 13, wherein the best-fit line generating step includes using a fit analysis chosen from one of: a total measurement uncertainty (TMU) analysis and an ordinary-least squares (OLS) analysis; and
   wherein the residual calculating step includes determining the residual for each data pair based on the measurement values of each data pair, a slope and y-intercept of the best-fit line and a residual angle, wherein the residual angle depends on the fit analysis.

15. The program product of claim 13, wherein the weight assigning step includes for a respective sample measurement:
   calculating an inverse of the residual for each data pair associated with the RMC to which the sample measurement belongs; and
   calculating the weight by summing the inverses.

16. A method for determining a reliability of a target measurement by combining reference measurement collections of at least three reference measurement systems into a weighted reference measurement collection, each reference measurement collection (RMC) including a plurality of corresponding sample measurements, each corresponding sample measurement having a measurement value of the same sample, the method comprising the steps of:
   assigning a weight to each sample measurement of each reference measurement collection indicative of an ability of the respective reference measurement system to measure that sample compared to other reference measurement systems;
   generating a weighted reference measurement collection (wRMC) by calculating, for each respective sample measurement, a weighted reference measurement based on the measurement value for the respective sample measurement for each RMC and the weights of the respective sample measurement for each RMC; and
   determining the reliability of the target measurement based on the weighted reference measurement collection.

17. The method of claim 16, wherein the weighted reference measurement collection generating step includes for each respective sample measurement:
   calculating the weighted reference measurement by dividing a first sum of multiples of each measurement value and a respective weight of the respective sample measurement by a second sum of all weights for the respective sample measurement.

18. The method of claim 16, wherein the assigning step includes:
   for each possible RMC pairing, plotting corresponding measurement values to generate a plurality of data pairs;
   generating a best-fit line of the plurality of data pairs for each RMC pairing;
   calculating a residual for each data pair, each residual associated with each RMC of the RMC pairing to which the respective residual belongs; and
   setting a weight to each sample measurement for each RMC, wherein each weight is based on the residuals associated with a respective RMC to which the sample measurement belongs and favors a smaller residual more than a larger residual.

19. The method of claim 18, wherein the best-fit line generating step includes using a fit analysis chosen from one of: a total measurement uncertainty (TMU) analysis and an ordinary-least squares (OLS) analysis.

20. The method of claim 18, wherein the weight setting step includes for a respective sample measurement:
   calculating an inverse of the residual for each data pair associated with the RMC to which the sample measurement belongs; and
   calculating the weight by summing the inverses.

* * * * *